Sept. 2, 1969      D. J. KOLESAR      3,464,654
LEVELING CONSTRUCTION FOR HEAVY MACHINERY AND INSTRUMENTS
Filed March 24, 1967      6 Sheets-Sheet 1

INVENTOR.
DANIEL J. KOLESAR
BY
ATTORNEYS

Sept. 2, 1969  D. J. KOLESAR  3,464,654
LEVELING CONSTRUCTION FOR HEAVY MACHINERY AND INSTRUMENTS
Filed March 24, 1967  6 Sheets-Sheet 2

INVENTOR.
DANIEL J. KOLESAR
BY
Barnes, Kisselle, Raisch & Choate
ATTORNEYS

INVENTOR.
DANIEL J. KOLESAR
BY
Barnes, Kisselle, Raisch & Choate
ATTORNEYS

INVENTOR.
DANIEL J. KOLESAR
BY
Barnes, Kisselle, Raisch & Choate
ATTORNEYS

Sept. 2, 1969 D. J. KOLESAR 3,464,654
LEVELING CONSTRUCTION FOR HEAVY MACHINERY AND INSTRUMENTS
Filed March 24, 1967 6 Sheets-Sheet 5

INVENTOR.
DANIEL J. KOLESAR
BY
Barnes, Kisselle, Raisch & Choate
ATTORNEYS

FIG. 16

United States Patent Office 3,464,654
Patented Sept. 2, 1969

3,464,654
LEVELING CONSTRUCTION FOR HEAVY
MACHINERY AND INSTRUMENTS
Daniel J. Kolesar, Warren, Mich., assignor to The
Babcock & Wilcox Company, New York, N.Y.,
a corporation of New Jersey
Filed Mar. 24, 1967, Ser. No. 625,653
Int. Cl. F16m 11/04
U.S. Cl. 248—13          32 Claims

ABSTRACT OF THE DISCLOSURE

The leveling construction described herein comprises three leveling assemblies at circumferentially spaced points on the base of the machinery or instrument, one of the leveling assemblies being utilized for adjusting for height, the other leveling assembly being utilized for adjusting for horizontal or azimuth position, and the third leveling assembly being utilized for a combined height and horizontal adjustment. Each of the leveling assemblies incorporates complementary surfaces which have pressure pads or pockets therein through which fluid under pressure is directed to flow between the surfaces and thereby hold the surfaces out of contact during the leveling process. In one form of the invention, motors are provided for adjusting each of the leveling assemblies. Schematic diagrams are shown for providing for automatic control of the level by utilizing level and azimuth sensors or by utilizing a gyroscopic or similar polar angle sensor.

BACKGROUND OF THE INVENTION

In the installation of heavy, precise machinery, instrumentation, surface plates, test stands and similar equipment, it is invariably necessary to set some reference plane on the equipment level; that is, parallel, within some limit depending on the type of machine, to the local horizontal, or perpendicular to the local gravity vertical. In some cases, such as astronomical equipment, aerospace attitude test stands, simulators, gimbal systems, gyrotest equipment and the like it is also necessary to set some reference plane to the sidereal orientation, that is, accurately at the latitude angle with respect to the earth's equator. In this case, unlike the case of gravity vertical leveling, the azimuthal orientation is also important since the earth's axis is at a definite azimuth position and the equipment must be oriented with respect to it, usually parallel.

It is very common for leveling to be done by a series of jack screws or inclined plane jacks at several points on the machine base. These suffer from the fact that they are hard to move and are in contact with the base by friction only rather than being firmly fixed to a definite point of the base. The result is that when a given jack is adjusted, since it can couple horizontal as well as vertical motion into the machine, the adjustment causes sliding of other mating surfaces of the jacks, and usually a loss of level at these locations. The overall effect is that leveling is a trial and error procedure which takes a long time and is subject to unexpected error due to slow accumulation of side forces at various jacks and then quick motion in response to the forces as they build up to and pass the static friction level.

A further distinction should be made between leveling and load sharing. The essential, overall machine level can be and to some extent is determined by three of whatever leveling devices are used. The remaining leveling jacks are mainly used for load sharing, that is, to reduce the structural deflection of the machine between the principal jacks which determine overall level. Of course, these separations of function are not perfectly clear cut; what the interspersed load sharing jacks actually do is to restore local areas to the main level plane by stressing or relieving stress in the intermediate structural members, but any given jack may at any time take over as a primary one, by having the largest deviation from the average position set into it.

Among the objects of the invention are to provide a leveling construction for heavy machinery and instruments which permits the leveling to be done with minimum effort and great accuracy; which obviates the disadvantages inherent in the heavy weight of the machinery or instrument; which is relatively simple; and which incorporates the use of fluid flowing between the surfaces so that there is no friction to be opposed during the leveling process.

A further object of the invention is to provide a system with such high stiffness as to be indistinguishable from mechanical jacks, but without the static friction which causes difficulty in operating conventional leveling devices.

Another object of the invention is to provide a means of dealing with coupled forces from one jack to another without force buildups and abrupt releases with their attendant jumps in machine position.

A further object is to provide integral azimuth adjustment independent of height adjustment for very precise azimuth orientation with a minimum of disturbance to the level of the machine.

A final object is to provide a system directly controllable by electric or hydraulic servo systems, controlled manually or by gravitation, and/or azimuth, or polar, sensing instruments and actuating directly or through speed reduction devices the screw inputs to the leveling construction so as to provide continuous monitoring and restoration of level and orientation.

SUMMARY

Basically, the invention comprises providing at least three leveling assemblies at circumferentially spaced points on the base of the machinery or instrument, one of the leveling assemblies being utilized for adjusting for height, the other leveling assembly being utilized for adjusting for horizontal or azimuth position, and the third leveling assembly being utilized for a combined height and horizontal adjustment. Each of the leveling assemblies incorporates complementary surfaces which have pressure pads or pockets therein through which fluid under pressure is directed to flow between the surfaces and thereby hold the surfaces out of contact during the leveling process. In one form of the invention, motors are provided for adjusting each of the leveling assemblies. Schematic diagrams are shown for providing for automatic control of the level by utilizing level and azimuth sensors or by utilizing a gyroscopic or similar polar angle sensor.

DESCRIPTION

Figure 1:
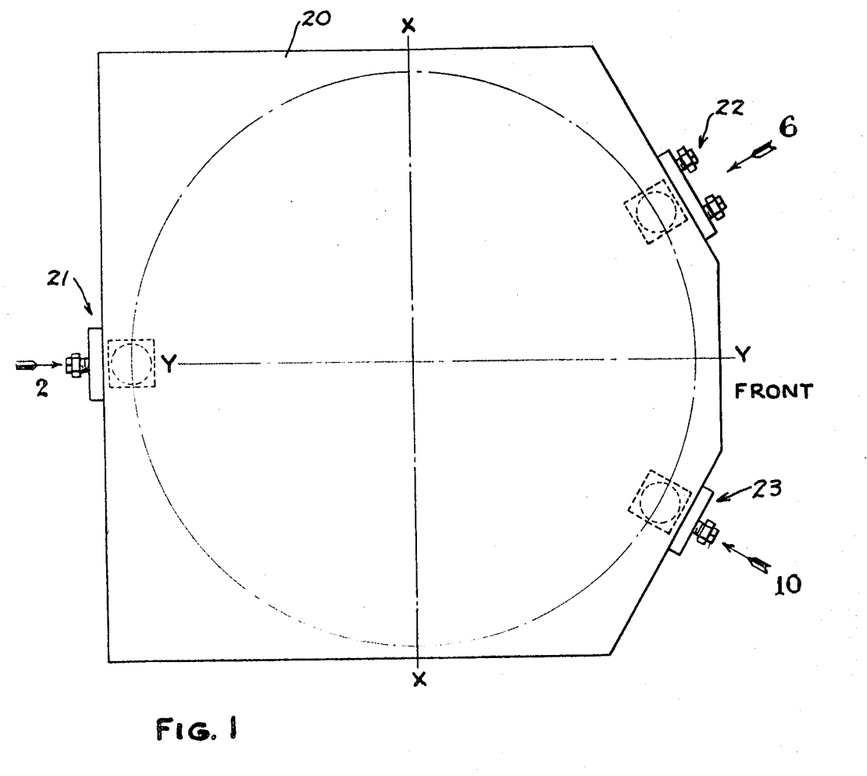
FIG. 1 is a plan view of the base of the machine embodying the invention.

Referring to FIG. 1, the invention relates to the leveling of a base 20 of a piece of heavy machinery or a heavy instrument. In accordance with the invention, leveling assemblies 21, 22, 23 are provided at circumferentially spaced points on the base 20. Each of the leveling assemblies 21, 22, 23 incorporates ground engaging feet or members, as presently described.

Figure 2:
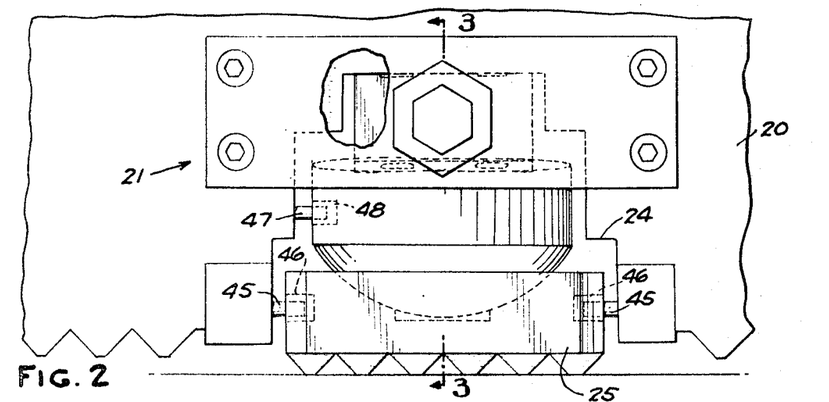
FIG. 2 is a fragmentary side elevational view taken in the direction of the arrow 2 in FIG. 1.
Figures 3, 3A, 4, 5:
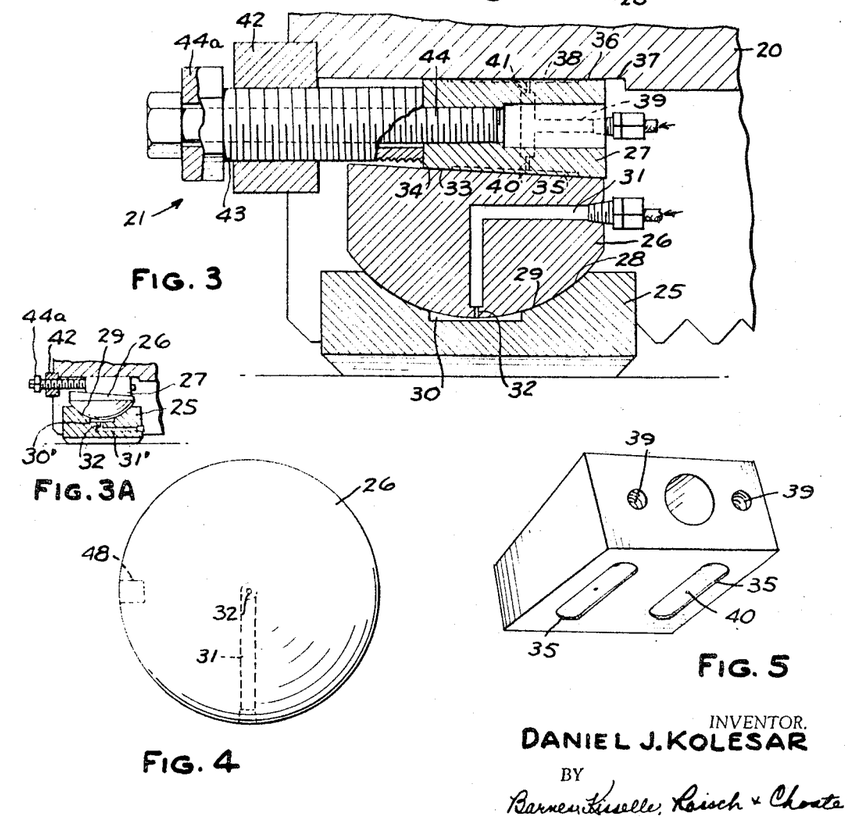
FIG. 3 is a fragmentary sectional view taken along the line 3—3 in FIG. 2.
FIG. 3A is a fragmentary sectional view similar to FIG. 3 of a modified form of construction.
FIG. 4 is a bottom plan view of one of the elements shown in FIGS. 2 and 3.
FIG. 5 is a perspective view of another of the elements shown in FIGS. 2 and 3.
Figure 6:
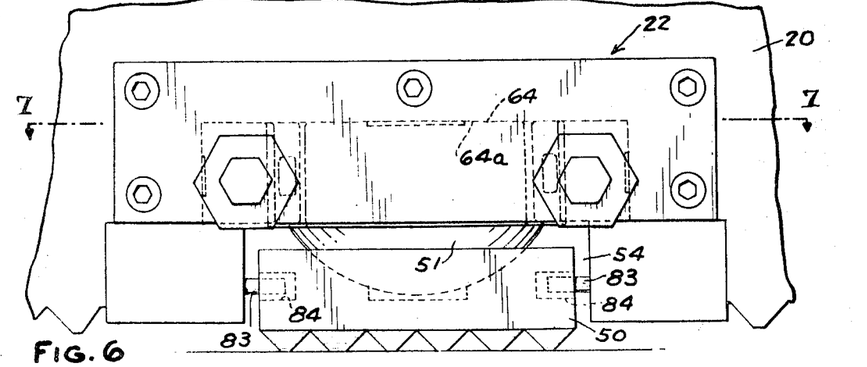
FIG. 6 is a fragmentary side elevational view on an enlarged scale taken in the direction of the arrow 6 in FIG. 1.

As shown in FIG. 2 the leveling assembly 21 is fitted within a cutaway portion 24 of the base 20 and comprises a ground engaging foot or member 25, an intermediate member 26 and a wedge member 27. The ground engaging member 25 includes an upwardly facing concave spherical surface 28 which is complementary to a convex spherical surface 29 on the intermediate member 26. Surface 28 includes a pressure pocket or pad 30 to which fluid under pressure is supplied through a passage 31 to a restrictor 32 from a source not shown. Since foot 25 is stationary, it might also be preferable to supply fluid to pocket 30' from an inlet and passage 31' in 25 as shown in FIG. 3A. When fluid is supplied, it flows from the pressure pad 30 outwardly in a thin film between surfaces 28, 29 thereby supporting the intermediate member 26 in frictionless relation to the ground engaging member 25. Wedge member 27 and intermediate member 26 have complementary surfaces 33, 34 at an angle to the horizontal. Surface 33 in member 27 is formed with a pressure pocket or pad 35. Wedge member 27 and the base 20 have complementary horizontal surfaces 36, 37. A pressure pad 38 is provided in the surface 36 of the wedge member 27. Fluid under pressure may be provided to the pressure pads 35, 38 through an inlet 39, restrictors 40, 41 associated with the pads 35, 38, respectively.

When fluid is supplied to the pressure pads 35, 38, it flows in a thin film between the surfaces 33, 34 and 36, 37 so that the wedge member is maintained out of contact with the surfaces of the intermediate member 26 and the base 20.

Means are provided for translating the wedge member 27 radially of base 20 along the surfaces 34, 37 and comprises a plate 42 through which a hollow screw 43 is threaded. The end of screw 43 engages wedge 27. A bolt 44 extends through screw 43 and is threaded into the wedge 27. By threading the screw 43 inwardly and outwardly, the wedge member 27 is translated along the surfaces 37, 34 to raise and lower the portion of the base 20 so that the leveling assembly 21 functions to provide a variable height. A lock nut 44A is provided for locking the position of the wedge member 27.

In order to maintain the leveling assembly 21 in position when the base is lifted in placing the machinery or instrument in place, retaining pins 45 are provided and extend into openings 46 in the sides of the foot. A retaining pin 47 extends into a similar opening 48 in the intermediate member 26.

Referring to FIGS. 6–9, the leveling assembly 22 is adapted to provide for horizontal or azimuth adjustment of the base and comprises a ground engaging foot or member 50, an intermediate wedge member 51 and wedge blocks 52, 53 that are positioned within a cutaway portion 54 of the base 20. As in the case of the leveling assembly 21, the ground engaging member is formed with a concave upwardly facing spherical surface 55 and the intermediate member 51 is formed with a complementary convex spherical surface 56. A pressure pad 57 is provided in the surface 55 and fluid is supplied to this pressure pad through an inlet passage 58 and restrictor R. The base 20 and intermediate member 51 have complementary horizontal surfaces 59, 60. A pressure pad 61 is provided in the surface 60 and is provided with fluid from the inlet 58 through a connecting passage 62 and a restrictor R. When fluid is supplied under pressure through passage 58, it flows to the pressure pads 57, 61 and thereafter between the surfaces 55, 56 and 59, 60, respectively, to hold the members 50, 51 and base 20 out of metal-to-metal contact with respect to one another.

The sides of member 51 (FIG. 7) are tapered as at 65, 66 and the wedge members 52, 53 have complementary surfaces 67, 68, respectively, in which pressure pockets 69, 70 are positioned. Each wedge member 52, 53 also has surfaces 71, 72 which are complementary to vertical surfaces 73, 74 on the base 20 which extend generally radially. Surfaces 71, 72 of the wedge members 52, 53 are angularly related with respect to surfaces 67, 68.

Figures 7, 8, 9:
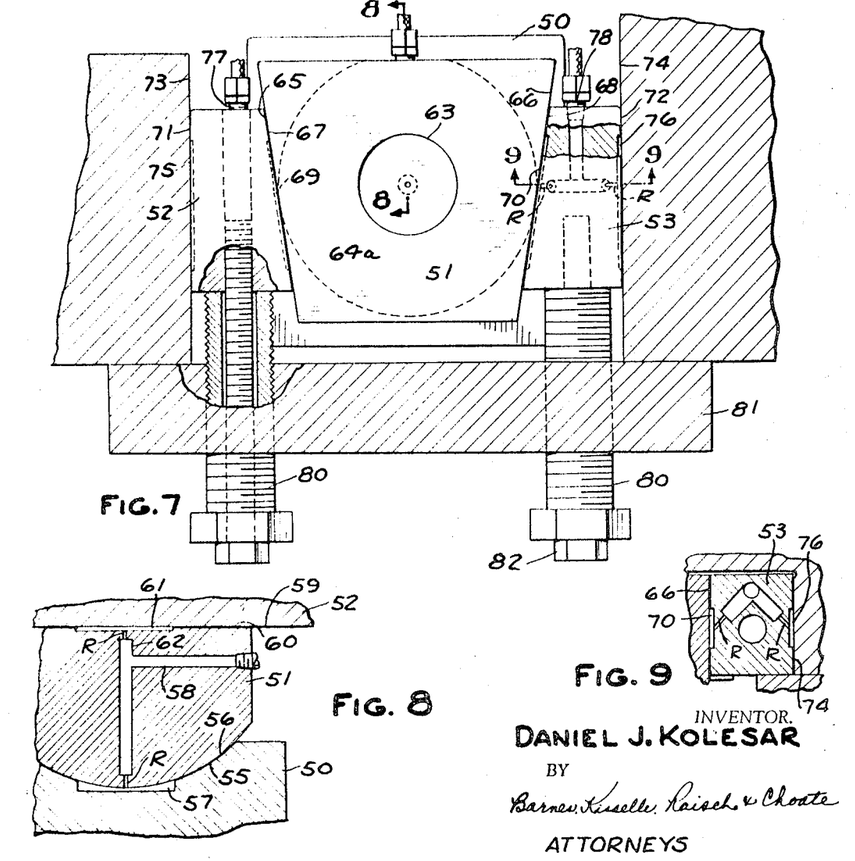
FIG. 7 is a fragmentary sectional view taken along the line 7—7 in FIG. 6.
FIG. 8 is a fragmentary sectional view taken along the line 8—8 in FIG. 7.
FIG. 9 is a fragmentary sectional view taken along the line 9—9 in FIG. 7.

A pressure pad 75, 76 is provided in the surface 73, 74. Fluid is supplied to the pads 69, 75 and 70, 76 through inlets 77, 78 and restrictors R so that when fluid flows through the pressure pads, it passes in a thin film between the respective surfaces. Each of the blocks 52, 53 is movable generally radially of base 20 by an adjusting screw 80 that is threaded through a plate 81 and telescoped over a bolt 82. Pins 83 extend into recesses 84 in member 50 to retain the assembly when the machine is lifted.

When fluid under pressure is being supplied to each of the pressure pads, various surfaces are maintained out of contact with one another by the flow of a thin film of liquid therebetween so that a base can easily be moved horizontally. By adjusting the screws 80, the desired position horizontally can be achieved since the movement of the wedge members 52, 53 can be in opposite directions to cause a resultant movement.

Figure 10:
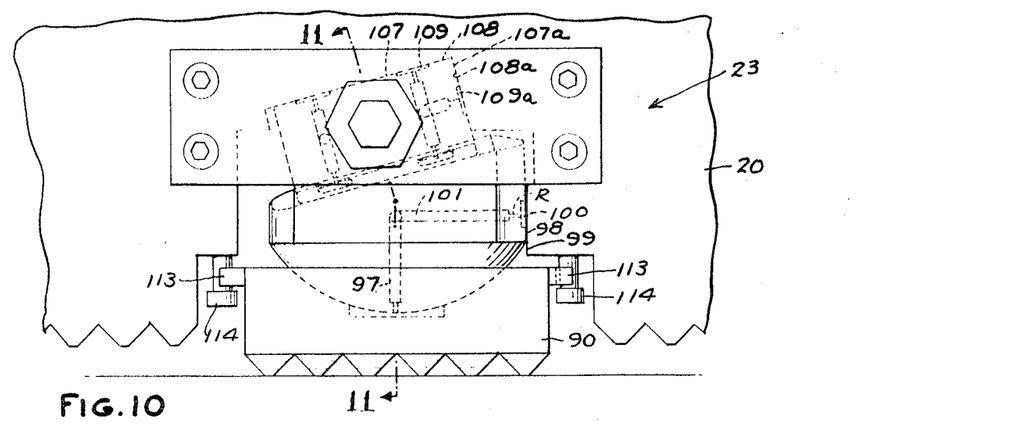
FIG. 10 is a fragmentary sectional view on an enlarged scale taken in the direction of the arrow 10 in FIG. 1.
Figure 11:
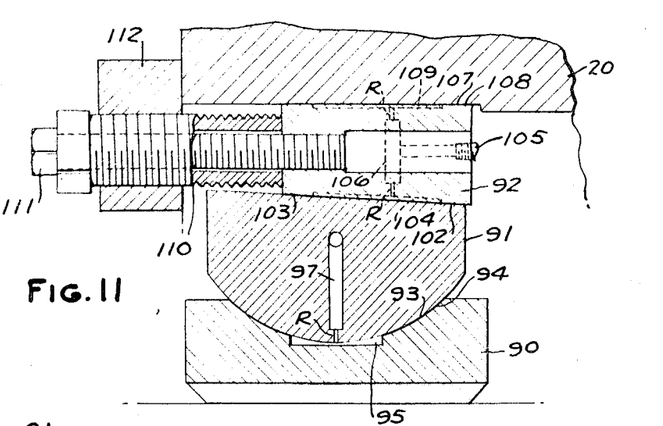
FIG. 11 is a fragmentary sectional view taken along the line 11—11 in FIG. 10.
Figure 12:
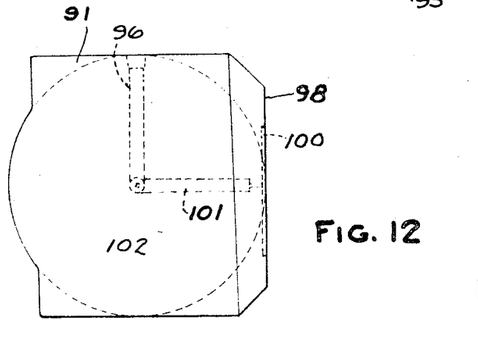
FIG. 12 is a bottom plan view of one of the elements shown in FIGS. 10 and 11.

The leveling assembly 23 as shown in FIGS. 10–12 comprises a ground engaging member 90, an intermediate member 91 and a wedge 92. As in the previous forms of leveling assemblies, the intermediate member 91 and the ground engaging member 90 have complementary spherical surfaces 93, 94 and a pressure pad 95 associated with restrictor R. Fluid is supplied to the pressure pad through an inlet 96 and passage 97. The intermediate member 91 includes a vertical surface 98 that is complementary to a corresponding surface 99 on the base 20. A pressure pad 100 and associated restrictor R are provided in the surface 98 and connected to the inlet 96 by the passage 101.

The upper surface 102 of the intermediate member 91 is inclined to the horizontal in the direction longitudinally and transversely of the axis of the movement of the wedge 92. The wedge 91 includes a complementary surface 103 having pressure pad 104 and restrictor R therein. Fluid is supplied to the pressure pad 104 through an inlet 105 and transverse passage 106. Wedge member 92 includes angularly related surfaces 107, 107a that are complementary to a surface 108, 108a in the base 20. Specifically, surfaces 108, 108a in the base 20 form angles with the horizontal, the surface 108a being generally at a right angle to the surface 108 and forming a greater angle with the horizontal.

Surfaces 107, 107a have a pressure pad 109, 109a and restrictor R therein which communicate with passage 106. The wedge member 92 is movable radially with respect to the base 20 by a screw 110 that is telescoped over bolt 111 and threaded into a plate 112 on the base. Extensions 113 on member 90 engage stops 114 to retain the assembly when the machine is lifted.

When fluid under pressure is supplied to each of the pressure pads, the complementary surfaces are maintained out of contact with one another so that the base 20 is free to move by adjustment of the wedge 92 both horizontally and vertically in the area of the leveling assembly 23.

Figure 13:
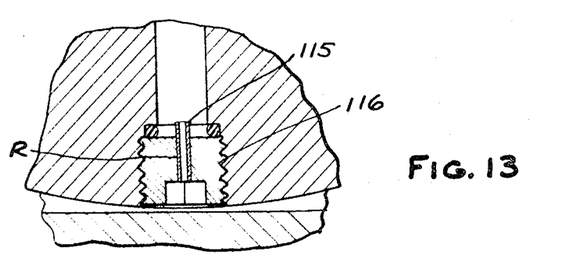
FIG. 13 is a sectional view through one of the restrictors associated with the leveling assembly.

As shown in FIG. 13, each restrictor R used in association with each of the pressure pads may comprise a capillary tube 115 which is fixed to a screw 116 that is threaded into an opening in the base of the corresponding pressure pad.

In use, the machine or instrument which is supported on the base 20 or wherein the base 20 forms a part thereof is transported to the desired position. Fluid under pressure is then supplied simultaneously to each of the leveling assemblies 21, 22, 23. The screws of each of the assemblies are then operated until the desired leveling of the base 20 is achieved; the screw of the leveling assembly 21 providing for a vertical adjustment; the screw of leveling assembly 22 providing for a horizontal adjustment; and the screw of leveling assembly 23 providing for both horizontal and vertical adjustment.

It may be found desirable to leave the entire system pressurized during operation, or if immobility is desired, it may be preferable to depressurize after adjustment. However, the amounts of lift at each foot being determined by the number of members, the compound angles of each, and the pressure and flow relations at each pad, it may be necessary to offset the level while pressurized so that the base will be level after depressurization.

Figure 14:
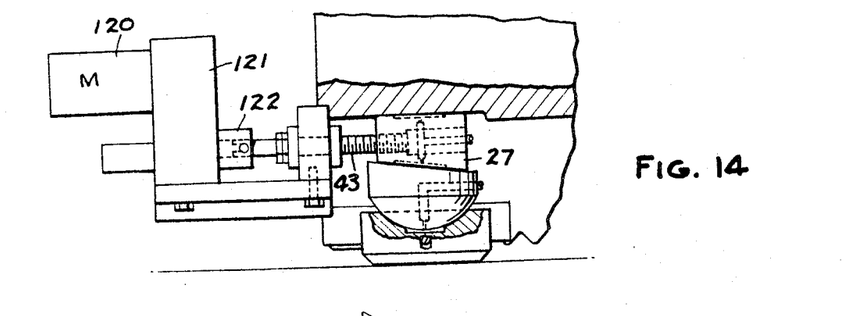
FIG. 14 is a part sectional side elevational view of a modified form utilizing a gear motor adapted to drive the adjustment screws of the three leveling constructions.

Instead of providing for manual rotation of the various adjusting screws in each of the leveling assemblies, motors can be provided as shown in FIG. 14 wherein such a motor is shown as applied to the leveling assembly shown in FIGS. 2–5. A gear motor 120 drives a gear reduction unit 121 which, in turn, is coupled by a coupling 122 to the end of the shaft 43. When it is desired to make an adjustment, an appropriate switch is manually operated to cause the motor to rotate in one direction or another and thereby, in turn, rotate the screw 43 and translate the wedge member 27.

The geared electric motor 120 can be replaced by a hydraulic motor, either directly driving the screw shaft or geared to it. The entire screw assembly can be replaced by a simple shaft and a hydraulic cylinder actuator used to move the shaft and wedge unit axially, controlled by a servo valve, with suitable modifications to the control electronics.

Figure 15:
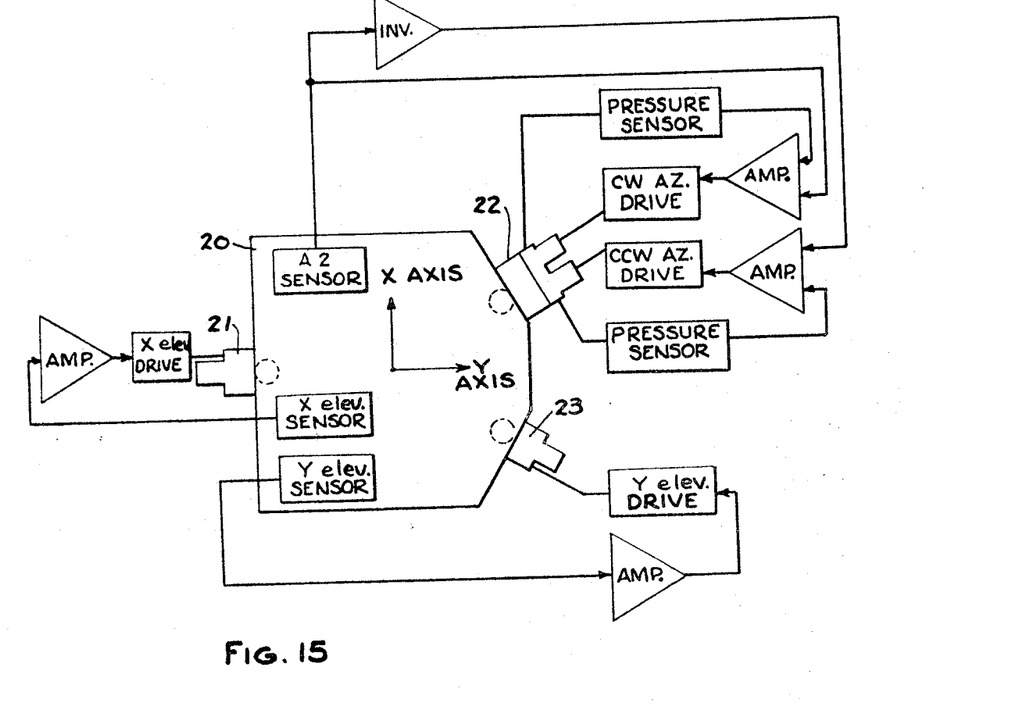
FIG. 15 is a schematic diagram of a complete level and azimuth loop using level and azimuth sensors.

Since the foot 21 controls base attitude about the axis X—X (FIG. 1) and the foot 23 controls base attitude about the axis Y—Y, and since as a result of the placement of the feet these axes are very nearly at right angles, it will be obvious that these motions do not interact with each other to any very great extent so that servo loops for continuous sensing and leveling may be made practically independent. This is especially true in this construction because of the ability of foot 22 to respond by angular movement to changes in setting of either foot 21 or foot 23 or both so that resistance from that foot does not produce compound motions. FIG. 15 is a schematic of a system to level the bore and position it in azimuth in a fully automatic manner.

Level sensors, labelled "X el sensor" and "Y el sensor" in FIG. 15 sense level errors about axes X—X and Y—Y (FIG. 1) (or the X-axis and Y-axis in FIG. 15) independently. These sensors may be gravity sensitive pendulums, or optical devices such as correctly oriented electric autocollimators reading mirrors slaved to local vertical servo systems or accelerometers reading cross-axis components or some similar device. Each sensor produces an error signal representing the out-of-level angle about the axis which it is monitoring. This signal is amplified and used to operate the foot actuator in such a direction as to drive the error to zero.

An azimuth sensor, labelled "AZ sensor" in FIG. 15 senses azimuth errors. It may be a gyrocompass, or a single gyro, or an electric autocollimator monitoring a fixed mirror off the base or some similar device. It also produces a signal which represents the error between desired azimuth and actual azimuth. This signal is sent directly to one amplifier and, after inversion, is sent to a second amplifier. The amplifiers raise the signal to a power level sufficient to drive the CW and CCW actuators on foot 22, respectively. Since the screws on foot 22 will probably not have exactly the same pitch, at least locally, a means must be provided to make certain that the wedge members 52 and 53 are driven equal amounts so that the hydrostatic gaps take equal loading. This is accomplished by providing pressure sensors reading hydrostatic pocket pressure in pressure pads on pockets 69 and 70, respectively and summing these signals in the drive amplifiers or in a separate comparator, so that after positioning to null the azimuth sensor signal, the remaining adjustment in one screw or the other can be automatically made to equalize the pressure on the two wedge members. It will be obvious that many variations of this control method are possible, for instance, only one screw might be used for the equalizing adjustment so that both pressure signals would be fed in opposition to that amplifier or to a comparator which drives that amplifier.

Figure 16:
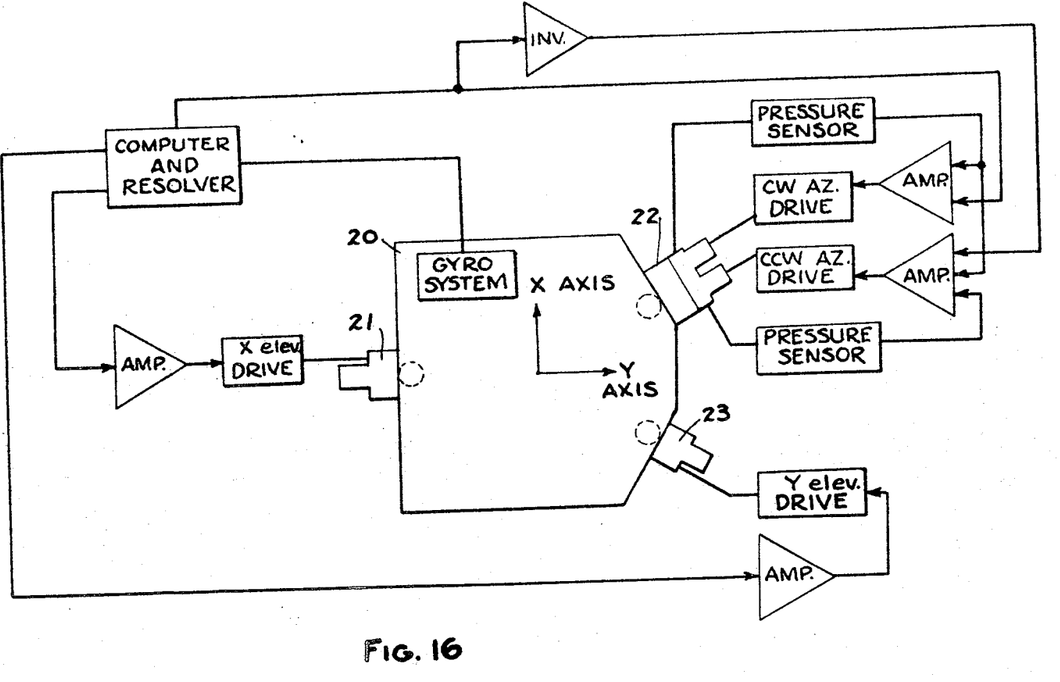
FIG. 16 is a schematic diagram of a complete level and azimuth loop using a gyro or similar polar angle sensor.

FIG. 16 shows another system in which it is desired to control attitude of the base 20 with respect to the earth's polar (or latitude) angle. In this system, a direct polar angle sensor is used as the reference. It may consist of a gyro, or set of gyros, or a strap-down gyro system and associated computer or similar device and it may include a cross-axis level sensor as described previously. The associated resolving and sensing devices (which may be quite simple in nature) have electrical outputs which are in analog form and are used to drive the three feet 21, 22 and 23 as before. FIG. 16. also shows an alternate form of pressure equalizing for the azimuth foot 22 as described in the previous paragraph.

It will be obvious that the invention as described employs hydrostatic compensation, as the phrase is understood in the art, throughout. This method of compensation is used in order to obtain the stiffness, frictionless operation, freedom from wear and other desirable characteristics commonly associated with hydrostatic devices.

Finally, it should be noted that inherent orifice compensation might be employed by replacing the restrictor inserts with appropriately sized small drilled holes in the various members between the oil feed lines and the pockets, if suitable precalculation of flow, lift, and the like are made.

I claim:

1. In a leveling construction for heavy machinery and instruments or the like, the combination comprising
   a base,
   a plurality of circumferentially spaced leveling assemblies on said base,
   a first said leveling assembly comprising
   a first ground engaging member, said first ground engaging member having a concave upwardly facing surface therein, a first intermediate member having a complementary convex spherical surface, a fluid pressure pad in one of said last-mentioned surfaces, a first wedge member, said first wedge member and said first intermediate member having complementary surfaces, a pressure pad on one of said complementary surfaces between said first wedge member and said first intermediate member, said base and said first wedge member having complementary surfaces, a pressure pad in one of said complementary surfaces between said wedge member and said base, said complementary surfaces between said first wedge member and said first intermediate member being non-parallel to said complementary surfaces between said first wedge member and said base, a restrictor associated with each said pressure pad, means for supplying fluid under pressure to each said pressure pad whereby when fluid is supplied to said pressure pads, a thin film of fluid flows between each pair of complementary surfaces, and means for adjusting the position of said first wedge member relative to said base and said first intermediate member, a second said leveling assembly comprising a second ground engaging member, said second engaging member having upwardly facing concave spherical surface thereon, a second intermediate member having a complementary convex spherical surface, a pressure pad on one of said complementary surfaces, said second intermediate member and said base having complementary substantially horizontal surfaces, a pressure pad in one of said last-mentioned surfaces, a pair of second wedge members, said second wedge members and said second intermediate member having complementary flat surfaces which are more vertical than horizontal, a pressure pad associated with one of said complementary surfaces between said second wedge members and said second intermediate member, said base and said second wedge members having complementary surfaces which are at an acute angle to the complementary surfaces between said second wedge members and said intermediate member, a pressure pad associated with one of said surfaces between said base and said second wedge member, a restrictor associated with each of said pressure pads, means for supplying fluid under pressure to each of said pressure pads whereby fluid flows continuously from each of said pressure pads and between the complementary surfaces, and means for adjusting the position of said wedge members relative to said base, a third said leveling assembly comprising a third ground engaging member, said third ground engaging member having a concave upwardly facing surface, a third intermediate member having a complementary convex spherical surface, a pressure pad on one of said complementary surfaces, said base and said intermediate member having complementary surfaces that are more vertical than horizontal, a pressure pad associated with one of said last-mentioned surfaces, a third wedge member, said base and said third wedge member having complementary angularly related surfaces along which said wedge member may be moved, at least one pressure pad associated with each of said surfaces, said third wedge member and said intermediate member having complementary surfaces that are more horizontal than vertical, a pressure pad associated with each of said last-mentioned surfaces, a restrictor associated with each of said pressure pads, means for supplying fluid under pressure to each of said pressure pads, means for translating said wedge member relative to said base along the two angularly related complementary surfaces.

2. The combination set forth in claim 1 wherein each of said leveling assemblies includes means for limiting the downward vertical movement of each said ground engaging member relative to said base when said base is lifted off of the ground.

3. The combination set forth in claim 1 wherein said means for adjusting the position of said wedge members comprises a hollow screw threaded into said base and engaging said wedge member and a headed bolt engaging and extending through said screw and threaded into said wedge member.

4. The combination set forth in claim 1 wherein said complementary surfaces between said first wedge member and said base extend horizontally.

5. The combination set forth in claim 1 wherein said complementary surfaces between said first intermediate member and said base extend horizontally.

6. The combination set forth in claim 1 wherein said complementary surfaces between said second wedge members and said base and between said second wedge members and said second intermediate member extend vertically.

7. The combination set forth in claim 6 wherein said complementary surfaces between said second intermediate member and said base extend horizontally, and said complementary surfaces between said second wedge members and said base and between said second wedge members and said second intermediate member extend vertically.

8. The combination set forth in claim 1 wherein said complementary surfaces between said third intermediate member and said base extend vertically.

9. The combination set forth in claim 1 wherein said angularly related surfaces of said third leveling assembly on said base form a right angle to one another.

10. The combination set forth in claim 1 wherein said angularly related surfaces of said third leveling assembly are parallel to the direction of movement of said wedge member relative to said base.

11. The combination set forth in claim 1 wherein said means for adjusting the positions of said wedge members includes power operated means.

12. The combination set forth in claim 1 including means for automatically adjusting said wedge members in response to variations in the position of said base.

13. The combination set forth in claim 12 wherein said last-mentioned means comprises horizontal, vertical and azimuth sensors.

14. The combination set forth in claim 1 including power operated means in response to signals from said sensor means for operating said wedge members.

15. The combination set forth in claim 12 wherein said last-mentioned means comprises a gyroscopic sensor means.

16. The combination set forth in claim 15 including power operated means in response to signals from said sensor means for operating said wedge members.

17. In a leveling construction for heavy machinery and instruments or the like, the combination comprising a base, a leveling assembly on said base comprising
a ground engaging member,
said ground engaging member having a concave upwardly facing surface therein,
an intermediate member having a complementary convex spherical surface,
a fluid pressure pad in one of said last-mentioned surfaces,
a wedge member,
said wedge member and said intermediate member having complementary surfaces,
a pressure pad on one of said complementary surfaces between said wedge member and said intermediate member,
said base and said wedge member having complementary surfaces,
a pressure pad in one of said complementary surfaces between said wedge member and said base,
said complementary surfaces between said wedge member and said intermediate member being non-parallel to said complementary surfaces between said wedge member and said base,
a restrictor associated with each said pressure pad,
means for supplying fluid under presure to each said pressure pad whereby when fluid is supplied to said pressure pads, a thin film of fluid flows between each pair of complementary surfaces, and
means for adjusting the position of said wedge member relative to said base.

18. The combination set forth in claim 17 wherein said leveling assembly includes means for limiting the downward vertical movement of each said ground engaging member relative to said base when said base is lifted free of the ground.

19. The combination set forth in claim 17 wherein said means for adjusting the position of said wedge members comprises a hollow screw threaded into said base and engaging said wedge member and a headed bolt engaging and extending through said screw and threaded into said wedge member.

20. The combination set forth in claim 17 wherein said complementary surfaces between said wedge member and said base extend horizontally.

21. In a leveling construction for heavy machinery and instruments or the like, the combination comprising
a base,
a leveling assembly on said base comprising
a ground engaging member,
said ground engaging member having an upwardly facing concave spherical surface thereon,
an intermediate member having a complementary convex spherical surface,
a pressure pad on one of said complementary surfaces,
a pair of wedge members,
said wedge member and said intermediate member having complementary flat surfaces which are more vertical than horizontal,
a pressure pad associated with one of said complementary surfaces between said second wedge members and said second intermediate member,
said base and said wedge members having complementary surfaces which are at an acute angle to the complementary surfaces between said wedge members and said intermediate member,
a pressure pad associated with one of said surfaces between said base and said wedge member,
a restrictor associated with each of said pressure pads,
means for supplying fluid under pressure to each of said pressure pads whereby fluid flows continuously from each of said pressure pads and between the complementary surfaces, and
means for adjusting the position of said wedge members relative to said base.

22. The combination set forth in claim 21 wherein said leveling assembly includes means for limiting the downward vertical movement of each said ground engaging member relative to said base when said base is lifted free of the ground.

23. The combination set forth in claim 21 wherein said means for adjusting the position of said wedge members comprises a hollow screw threaded into said base and engaging said wedge member and a headed bolt engaging and extending through said screw and threaded into said wedge member.

24. The combination set forth in claim 21 wherein said complementary surfaces between said intermediate member and said base extend horizontally.

25. The combination set forth in claim 21 wherein said complementary surfaces between said wedge members and said base and between said wedge members and said intermediate member extend vertically.

26. The combination set forth in claim 21 wherein said complementary surfaces between said intermediate member and said base extend horizontally, and said complementary surfaces between said wedge members and said base and between said wedge members and said intermediate member extend vertically.

27. In a leveling construction for heavy machinery and instruments or the like, the combination comprising:
a base,
a leveling assembly on said base comprising
a ground engaging member,
said ground engaging member having a concave upwardly facing surface,
an intermediate member having a complementary convex spherical surface,
a pressure pad on one of said complementary surfaces,
an intermediate member,
said base and said intermediate member having complementary surfaces that are more vertical than horizontal,
a pressure pad associated with one of said last-mentioned surfaces,
a wedge member,
said base and said wedge member having complementary angularly related surfaces along which said wedge member may be moved,
at least one pressure pad associated with each of said surfaces,
said wedge member and said intermediate member having complementary surfaces that are more horizontal than vertical,
a pressure pad associated with each of said last-mentioned surfaces,
a restrictor associated with each of said pressure pads,
means for supplying fluid under pressure to each of said pressure pads,
means for translating said wedge member relative to said base along the two angularly related complementary surfaces.

28. The combination set forth in claim 27 wherein said leveling assembly includes means for limiting the downward vertical movement of each said ground engaging member relative to said base when said base is lifted free of the ground.

29. The combination set forth in claim 27 wherein said complementary surfaces between said intermediate member and said base extend vertically.

30. The combination set forth in claim 27 wherein said angularly related surfaces on said base form a right angle to one another.

31. The combination set forth in claim 27 wherein said angularly related surfaces are parallel to the direction of movement of said wedge member relative to said base.

32. The combination set forth in claim 27 wherein said complementary surfaces between said intermediate member and said base extend vertically, said angularly related surfaces on said base form a right angle to one another and said angularly related surfaces are parallel to the direction of movement of said wedge member relative to said base.

References Cited

UNITED STATES PATENTS

| | | | |
|---|---|---|---|
| 1,463,406 | 7/1923 | Serrell et al. | 248—23 |
| 2,551,180 | 5/1951 | Starr et al. | 248—183 X |
| 2,790,119 | 4/1957 | Konet et al. | |
| 2,839,974 | 6/1958 | Reiner et al. | 95—12.5 |
| 2,852,883 | 9/1958 | Walsh | 248—188.9 |
| 2,914,289 | 11/1959 | Schutt. | |
| 2,956,761 | 10/1960 | Weber | 248—23 X |
| 3,060,824 | 10/1962 | Brenner et al. | 95—12.5 |
| 3,155,383 | 11/1964 | Whitmore | 248—23 X |
| 3,208,698 | 9/1965 | Samhammer et al. | 248—188.9 X |
| 3,208,707 | 9/1965 | Blumrich | 248—188.9 |
| 3,306,562 | 2/1967 | Bellefleur | 248—23 X |
| 3,307,819 | 3/1967 | Cocito | 248—363 |
| 3,310,263 | 3/1967 | Cavanaugh | 248—23 |
| 3,333,801 | 8/1967 | Falk | 248—19 |
| 3,356,324 | 12/1967 | Attermeyer | 248—188.4 X |
| 3,365,161 | 1/1968 | Deitch | 248—363 X |

ROY D. FRAZIER, Primary Examiner

J. FRANKLIN FOSS, Assistant Examiner

U.S. Cl. X.R.

248—23, 188.2